United States Patent [19]
Eisenhauer

[11] 4,381,531
[45] Apr. 26, 1983

[54] ALTERNATING CURRENT MOTOR PROTECTION SYSTEM
[75] Inventor: Virgil E. Eisenhauer, Camillus, N.Y.
[73] Assignee: Carrier Corporation, Syracuse, N.Y.
[21] Appl. No.: 280,161
[22] Filed: Jul. 2, 1981
[51] Int. Cl.³ .................. H02H 3/08; H02H 3/26
[52] U.S. Cl. .................................... 361/87; 361/93
[58] Field of Search .............. 361/24, 30, 31, 87, 361/93, 96, 97, 98

[56] References Cited
U.S. PATENT DOCUMENTS

| | | | |
|---|---|---|---|
| 3,814,986 | 6/1974 | Zanini | 361/30 |
| 3,919,600 | 11/1975 | Sons | 317/13 R |
| 4,103,317 | 7/1978 | Krick | 361/31 |
| 4,219,858 | 8/1980 | De Puy et al. | 361/93 |
| 4,234,901 | 11/1980 | Strickland, Jr. | 361/87 X |
| 4,335,413 | 6/1982 | Engel et al. | 361/93 |

Primary Examiner—Harry E. Moose, Jr.
Attorney, Agent, or Firm—Donald F. Daley; David L. Adour

[57] ABSTRACT

A system for protecting a three-phase motor is disclosed. The system includes a signal conditioning circuit which senses the magnitude of current flowing through each motor phase and generates a single-line, three-phase voltage output signal having each of its phases corresponding to a single motor current phase. This three-phase voltage output signal is efficiently utilized by a microcomputer system to detect motor current overload and motor current imbalance. The microcomputer system instructs a motor controller to shut down the motor in response to a motor current overload or motor current imbalance.

7 Claims, 6 Drawing Figures

ALTERNATING CURRENT MOTOR PROTECTION SYSTEM

BACKGROUND OF THE INVENTION

The present invention relates to motor protection systems and more particularly relates to a system for protecting a multi-phase alternating current (AC) motor from current overload and current imbalance.

Motor protection systems are known for preventing damage to electrical motors due to excessive current. Some of these systems include circuitry for sensing the current applied to a three-phase alternating current (AC) electrical motor and for terminating the supply of current to the motor when the sensed current rises above a predetermined level. Conventionally, these systems utilize a three-phase diode bridge to convert a sensed AC signal into a rectified direct current (DC) output. Inherently, the use of the diodes limits the sensitivity of the circuitry because of voltage losses associated with the operation of diodes. In addition, it is difficult to detect current imbalance with these systems because the DC output is a composite waveform corresponding to all of the three AC motor current phases. Thus, if the magnitude of one phase of the current is very high while the magnitude of a different phase of the current is very low, such that the magnitude of the combined current phases is normal, these systems detect no problem even though the magnitude of the one current phase is excessively high.

The advent of microprocessors and microcomputer systems has provided an opportunity for improving the performance of motor protection systems. A microcomputer system can be used to process a voltage signal from a motor protection circuit to obtain information about the current flow through each motor phase. Conventional motor protection systems are capable of being used with such microcomputer systems. However, the voltage signals generated by the circuitry of these systems require large amounts of computer memory to properly process the voltage signals and information regarding individual motor phases is difficult if not impossible to obtain from these signals. Thus, the capabilities of a microcomputer are not efficiently, and cost-effectively utilized if voltage signals from these conventional motor protection circuits are used by a microcomputer to provide a motor protection system.

SUMMARY OF THE INVENTION

Therefore, an object of the present invention is to provide a motor protection system which is efficient, reliable, accurate, and sensitive to relatively small motor current overloads in a multi-phase AC motor.

Another object of the present invention is to provide a motor protection system for detecting phase imbalance in a multi-phase AC motor.

A further object of the present invention is to provide a motor protection system having a signal conditioning circuit which is designed for providing an output voltage signal which can be efficiently used by a microcomputer system to monitor the current flow through each phase of a multi-phase AC motor.

A still further object of the present invention is to provide a signal conditioning circuit for sensing a multi-phase current and for generating a single-line multi-phase output voltage signal in response thereto, wherein each phase of the output voltage signal corresponds to only one individual current phase.

A still further object of the present invention is to provide a single conditioning circuit for sensing a multi-phase current, and for generating a single-line multi-phase output voltage signal in response thereto, and for generating a series of timing pulses which may be used to trigger the operation of a microcomputer system which is used to analyze the output voltage signal.

These and other objects of the present invention are attained by a motor protection system comprising a signal conditioning circuit, a signal processing means, and a motor controller. The signal conditioning circuit includes current sensing means, operational amplifier means, switching transistors, and zero cross detectors. Preferably, the current sensing means is three current transformers, each of which generates a distinct voltage signal proportional to the magnitude of the current flowing through an individual motor phase. The operational amplifier means adjusts the magnitudes of the voltage signals to a scale which is suitable for processing by the switching transistors and the zero cross detectors. The switching transistors connect and disconnect each of the scaled voltage signals to a common load in a sequence which is determined by the operation of the zero cross detectors. A single-line three-phase output voltage signal is formed wherein the first, second and third voltage phases each have a magnitude which is directly proportional to the magnitude of the current flowing through the first, second and third motor phases, respectively.

Preferably, the signal processing means is a microcomputer system which includes an analog to digital (A-D) converter and a microcomputer. The A-D converter converts the three-phase analog output voltage signal from the signal conditioning circuit into a digital signal which is processed by the microcomputer. Since each phase of the output voltage signal corresponds to a distinct motor current phase the microcomputer can directly process the voltage signal to obtain information about each current phase. The microcomputer is programmed to instruct the motor controller, which typically includes a power supply and switches for controlling the flow of current from the power supply to the motor, to shut down the motor in response to a current overload or current imbalance.

BRIEF DESCRIPTION OF THE DRAWINGS

Still further objects and advantages of the present invention will be apparent from the following detailed description in conjunction with the accompanying drawings, wherein like reference numerals identify like elements, and in which:

FIG. 4 is a graph of the time variation of the magnitude of a three-phase output voltage signal generated by the signal conditioning circuit shown in FIG. 3 from the phase A, B, and C voltage signals shown in FIG. 4.

DESCRIPTION OF THE PREFERRED EMBODIMENT

Figure 1:
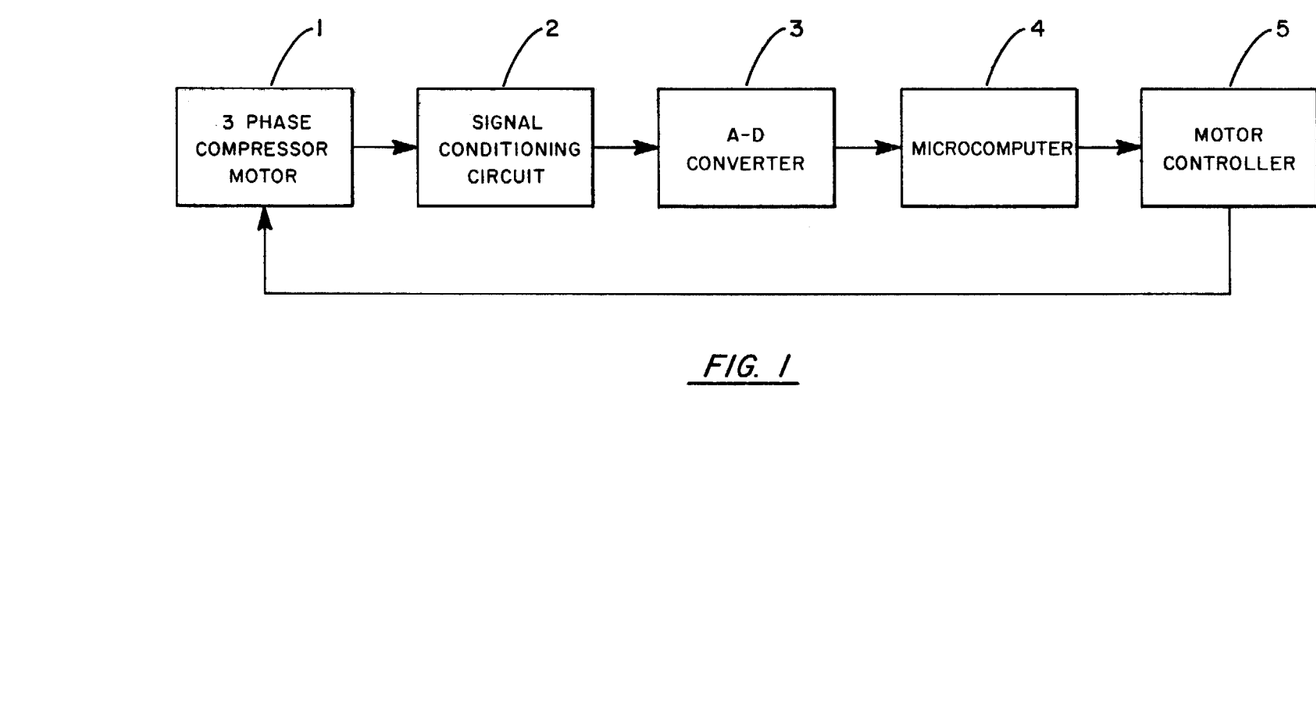
FIG. 1 is a block diagram showing the interrelationship of electrical systems in a motor protection system constructed according to the principles of the present invention.

Referring to FIG. 1, a block diagram of a motor protection system for a three-phase alternating current (AC) motor 1 is shown. This system is constructed according to the principles of the present invention and is particularly suitable for protecting a three-phase AC motor from current overload and current imbalance.

As shown in FIG. 1, the three-phase AC motor 1 is monitored by a signal conditioning circuit 2. The analog output signal from the circuit 2 is processed by an analog to digital (A-D) converter 3 to provide a suitable digital signal for use by a microcomputer 4 which is part of a microcomputer system comprising the A-D converter 3 and microcomputer 4. The A-D converter 3 may be National Semiconductor's Model ADC 0816 which is an 8 bit, 16 channel, multiplex system. The microcomputer 4 processes the digital signal to determine if a current overload or current imbalance exists at the three-phase AC motor 1. If such a condition does exist, the microcomputer supplies a signal to a motor controller 5 which discontinues the flow of current to the motor 1 thereby shutting down the motor 1. Of course, if desired, other different protective actions may be taken by the controller 5 in response to the signal from the microcomputer 4, depending on what type of protective action is required.

Figure 2:
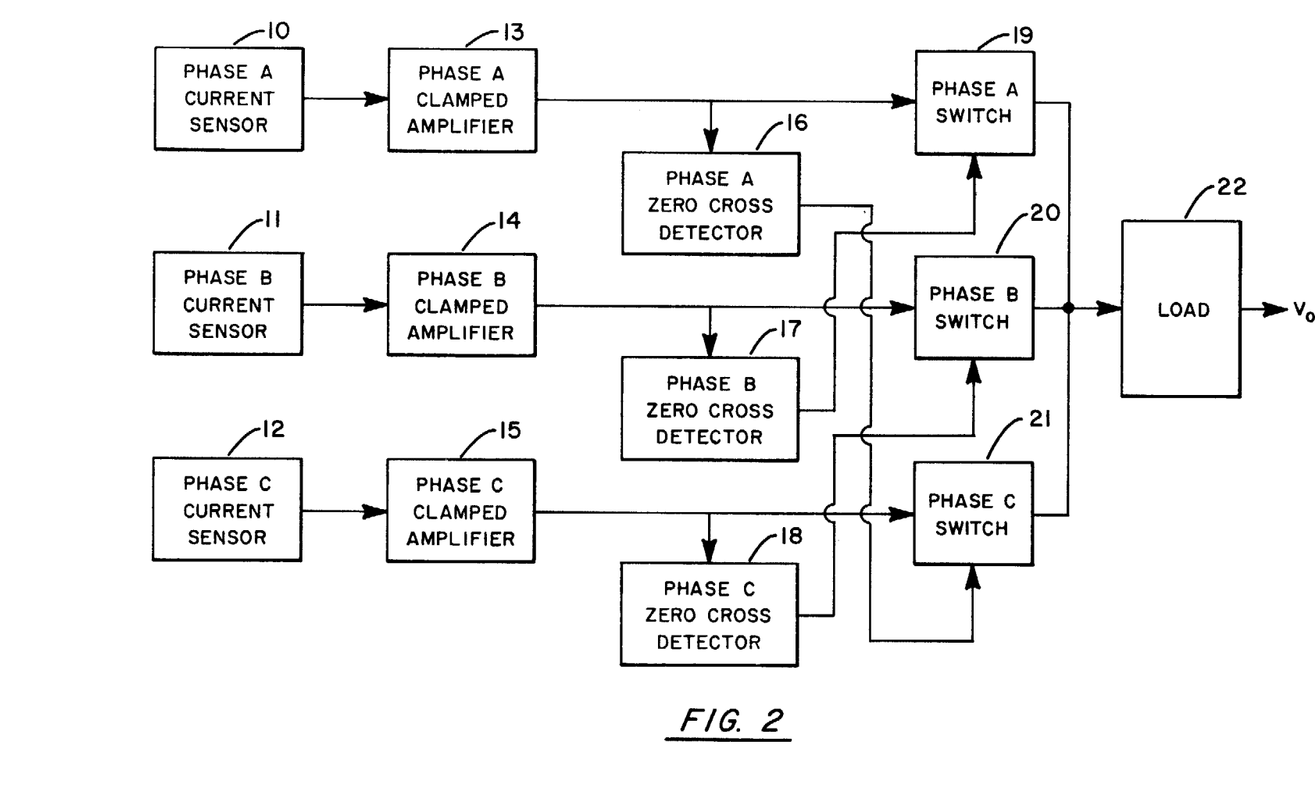
FIG. 2 is a block diagram of the signal conditioning circuit of the motor protection system shown in FIG. 1.

Referring to FIG. 2, an expanded block diagram is shown for the signal conditioning circuit 2 shown in FIG. 1. This circuit 2 includes three current sensors 10, 11, and 12, which separately sense the current flow through each motor phase A, B, or C, respectively, of the motor 1. The current sensors 10, 11, and 12 generates three separate voltage signals each of which is directly proportional in magnitude to the magnitude of the current flowing through the motor phase with which the current sensor is associated.

The phase, A, B, and C voltage signals are supplied to operational amplifier means 13, 14, and 15, respectively. These amplifier means 13, 14, and 15 are voltage clamped and are designed to scale the magnitude of each of the three voltage signals from the current sensors 10, 11, and 12 to a magnitude which is suitable for proper operation of the remainder of the circuitry.

The voltage signals from the amplifier means 13, 14, and 15 are applied to a load 22 by the operation of three switches 19, 20, and 21 which transmit only positive voltage signals. The operation of the switches 19, 20 and 21 are controlled by zero cross detectors 16, 17 and 18 whereby only one of the voltage signals is connected to the load 22 at any one time and whereby the voltage signals are sequentially connected to the load 22 in a periodic manner. This is accomplished by the phase A zero cross detector 16 operating the phase C switch 21 to connect the phase C voltage signal, from the phase C clamped amplifier 15, to the load 22 when the phase A voltage signal falls below a zero cross level and to disconnect the phase C voltage signal from the load 22 when the phase A voltage signal rises above the zero cross level. The phase B zero cross detector 17 and phase C zero cross detector 18 operate similarly to the phase A zero cross detector 16 to connect and disconnect the phase A and phase B voltage signals, respectively, to the load 22. The term zero cross level as used herein, designates crossing any selected constant voltage level including a zero voltage level. The use of a constant voltage level other than zero for the zero cross level does not affect the overall operation of the signal conditioning circuit 2 since it is the normal phase difference of one-hundred twenty electrical degrees between the phase A, B, and C voltage signals which keys operation of the zero cross detectors 16, 17 and 18. This operation of the signal conditioning circuit 2 results in the generation of a single-line three-phase output voltage signal, $V_o$, wherein each phase of the output voltage signal, $V_o$, is related to only one of the three motor current phases.

Figure 3:
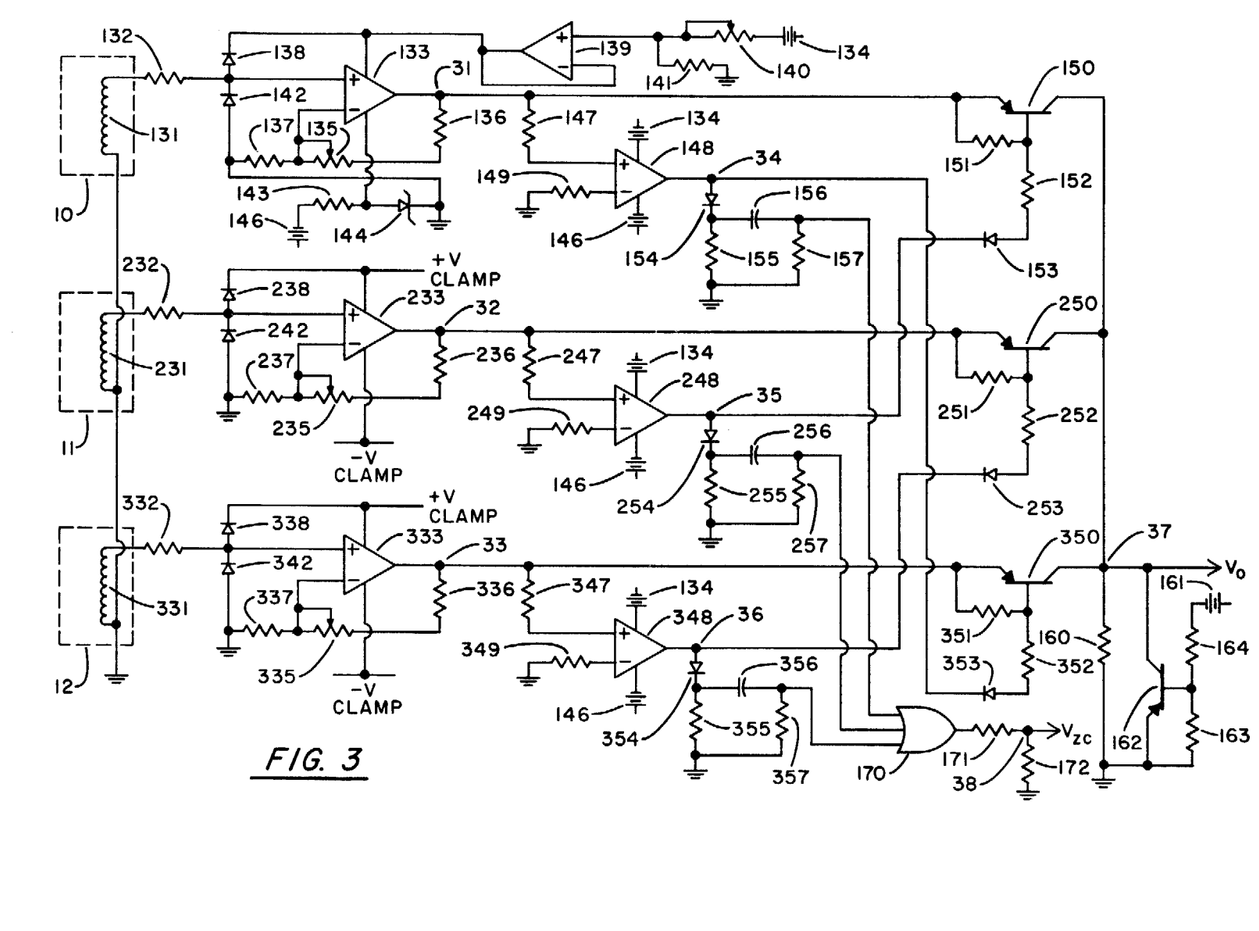
FIG. 3 is a circuit diagram showing specific electronic components for the signal conditioning circuit shown in FIG. 2.

Referring to FIG. 3, specific components are shown for the signal conditioning circuit 2 of FIGS. 1 and 2. The current sensors 10, 11 and 12, shown in FIG. 2, correspond to current transformers 131, 231 and 331, respectively, as shown in FIG. 3. However, it should be noted that any suitable current pickups 131, 231, and 331 may be used and that a current transformer is only one such suitable kind of current pickup. The current transformers 131, 231, and 331 are connected to the motor terminals of the three-phase motor 1 whose operating conditions it is desired to monitor. The current transformers 131, 231, and 331, each are connected to a different motor terminal and are designated conveniently as a phase A, B, or C current transformer, respectively. The voltage signal generated by the phase A, C, or C current transformer 131, 231 or 331 is directly proportional in magnitude to the current flowing through motor phase A, B or C, respectively. The phase A voltage signal generated by current transformer 131 is supplied through a resistor 132 to the noninverting input of operational amplifier 133. Similarly, the phase B and C voltage signals are supplied to the noninverting inputs of operational amplifiers 233 and 333 through resistors 232 and 332, respectively.

As shown in FIG. 3, the phase A, B, and C clamped amplifiers 13, 14, and 15, shown in FIG. 2, correspond to an operational amplifier system comprising operational amplifiers 133, 233, and 333 and circuit components directly affecting the operating characteristics of these operational amplifiers 133, 233, and 333. The operational amplifiers 133, 233, and 333 are part of a packaged operational amplifier system, such as two LM324N packaged quad operational amplifier systems, comprising all the operational amplifiers 133, 233, 333, 148, and 248, 348, and 139 which are part of the signal conditioning circuit 2. The amount of amplification of the phase A, B, or C voltage signal supplied to the noninverting input of the operational amplifier 133, 233, or 333, respectively, depends on the resistance values of resistor 136, 236, or 336, resistor 137, 237, or 337 and variable resistance device 135, 235, or 335, respectively, connected as shown in FIG. 3. These resistance values are selected so that the magnitude of the amplified phase A, B, or C voltage signal is within a suitable voltage range for proper processing by the zero cross detectors 16, 17, and 18 and switches 19, 20, and 21 of the signal conditioning circuit 2.

The operational amplifiers 133, 233, 333 have a positive voltage clamp and a negative voltage clamp. The positive voltage clamp for each operational amplifier 133, 233, and 333 is provided by voltage follower 139 having a voltage supply 134 connected to its noninverting input through a variable resistance device 140. Also, the noninverting input of voltage follower 139 is connected to circuit common (circuit common, as used herein, means ground potential or a common point of equal potential) through a resistor 141 as shown in FIG. 3. A diode 138, 238, or 338 connects the output terminal of the voltage follower 139 to the noninverting input of the operational amplifier 133, 233, or 333, respectively. The positive voltage clamp prevents each operational amplifier 133, 233, or 333 from accepting a voltage signal, supplied at its noninverting input, greater in magnitude than the clamped supply voltage from the voltage follower 139.

The negative voltage clamp for the operational amplifiers 133, 233, and 333 is provided by a voltage supply 146 connected to the operational amplifiers 133, 233, 333, through a resistor 143 which is connected to circuit common through a zener diode 144 as shown in FIG. 3. Also, a diode 142, 242, or 342 connects the noninverting input of the operational amplifiers 133, 233, or 333, respectively, to circuit common as shown in FIG. 3. The negative voltage clamp prevents each operational amplifier 133, 233, or 333 from accepting a voltage signal, supplied at its noninverting input, greater in magnitude than the clamped negative supply voltage.

Each phase A, B or C voltage signal from each clamped amplifier 13, 14, or 15, respectively, is provided to a PNP switching transistor 150, 250, or 350, respectively, as shown in FIG. 3. The PNP switching transistors 150, 250, and 350 and their associated circuit elements correspond to the phase A, B, and C switches 19, 20 and 21, respectively, which are shown in FIG. 2. As shown in FIG. 3, the circuit elements associated with each transistor 150, 250, or 350 are a leakage resistor 151, 251, or 351, respectively, a resistor 152, 252, or 352, respectively, and a protective diode 153, 253, or 353, respectively.

As shown in FIG. 2, each switch 19, 20 and 21 is operated by a zero cross detector 16, 17 or 18, respectively. The phase A zero cross detector 16, corresponding to operational amplifier 148, resistors 148, 149, and 155, and diode 154 connected as shown in FIG. 3, operates the phase C switch 21 which includes the switching transistor 350 as shown in FIG. 3. Similarly, the phase B zero cross detector 17, corresponding to operational amplifier 248, resistors 247, 249, and 255, and diode 254 connected as shown in FIG. 3, operates the phase A switch 19 which includes the switching transistor 150 as shown in FIG. 3. Also, the phase C zero cross detector 18, corresponding to operational amplifier 348, resistors 347, 349, and 355, and diode 354, connected as shown in FIG. 3, operates the phase B switch 20 which includes the switching transistor 250 as shown in FIG. 3.

As shown in FIG. 3 the phase A voltage signal from the operational amplifier 133 is supplied to the resistor 147 and to the noninverting input of the operational amplifier 148. Similarly, the phase B and C signals from the operational amplifiers 233 and 333, respectively, are supplied to resistors 247 and 347, respectively, and to the noninverting inputs of operational amplifiers 248 and 348, respectively. The operational amplifiers 148, 248 and 348 have their inverting inputs connected to circuit common through the resistors 149, 249, and 349, respectively. The operational amplifiers 148, 248, and 348, are powered by the positive voltage supply 134 and by the negative voltage supply 146 which are the same voltage supplies 134, 146 used for establishing the positive and negative voltage clamps, respectively. The output terminal of each operational amplifiers 148, 248, or 348 is connected, through the diode 154, 254 or 354 and then through the resistor 155, 255 or 355, respectively, to circuit common, as shown in FIG. 3. The PNP switching transistors 150, 250, and 350 have their collectors connected to circuit common, as shown in FIG. 3, through a load resistor 160 which corresponds to the load 22 shown in FIG. 2. As described previously, the difference in phase of the signals supplied to the inputs of the operational amplifiers 148, 248 and 348 results in operating the switching transistors 150, 250, and 350, to supply the phase A, B, and C voltage signals from the operational amplifiers 133, 233, 333 to the load resistor 160 at separate times, in sequence, so that a single-line, three-phase output voltage signal $V_o$, is generated at a point 37. Each phase of the output voltage signal, $V_o$, has a magnitude which is directly proportional to the magnitude of motor current phase A, B, of C, respectively.

As shown in FIG. 3, a negative voltage clamp comprising PNP transistor 162 having a leakage current resistor 163 and supplied with a base drive from voltage source 161 through resistor 164 is provied to prevent the three-phase output voltage signal, from becoming excessively negative. If the output voltage signal, $V_o$, is excessively negative then the switching transistor 162 conducts thereby shunting this negative voltage to circuit common. This prevents an excessive negative voltage from reaching a processing device such as the analog to digital converter 3 shown in FIG. 1.

Associated with each zero cross detector 16, 17, and 18 is a pulse forming network. For example, as shown in FIG. 3. for phase A, the pulse forming network comprises a capacitor 156 connected in series with a resistor 157 to circuit common. At a point between the capacitor 156 and the resistor 157, an electrical lead is connected to an OR gate 170. Also, the OR gate 170 is connected to the pulse forming networks associated with the other zero cross detectors 17 and 18. The phase B zero cross detector 17 has capacitor 256 and resistor 257 connected identically as described for the phase A zero cross detector 16. Similarly, the phase C zero cross detector 18 has capacitor 356 and resistor 357 connected identically as described for the phase A zero cross detector 16. The output of the OR gate 170 is connected to circuit common through load resistors 171 and 172 and a voltage pulse signal, $V_{zc}$, is present at a point 38 between the resistors 171 and 172. This signal, $V_{zc}$, may be used to trigger and synchronize the microcomputer system as depicted in FIG. 1.

Figure 4:
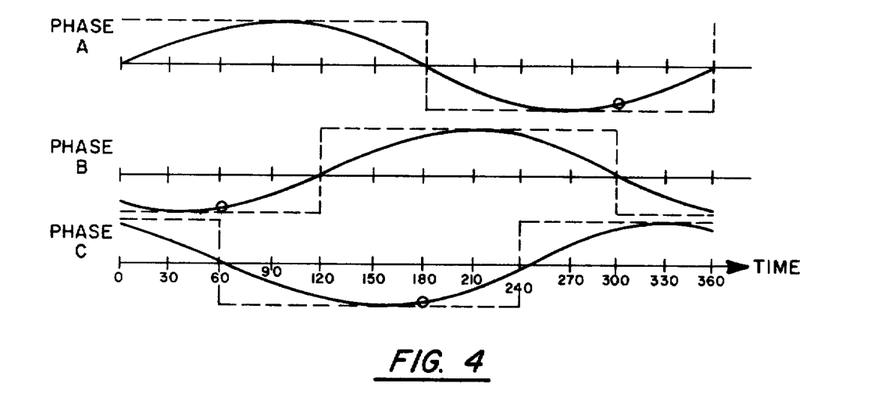
FIG. 4 depicts the time variations of the magnitudes of distinct phase A, B, and C voltage signals generated by the circuit components shown in FIG. 3 which correspond to the phase A, B, and C clamped amplifiers of FIG. 2, in response to a typical balanced three-phase motor current flow sensed by the current transformers of the signal conditioning circuit shown in FIG. 3.
Figure 5:
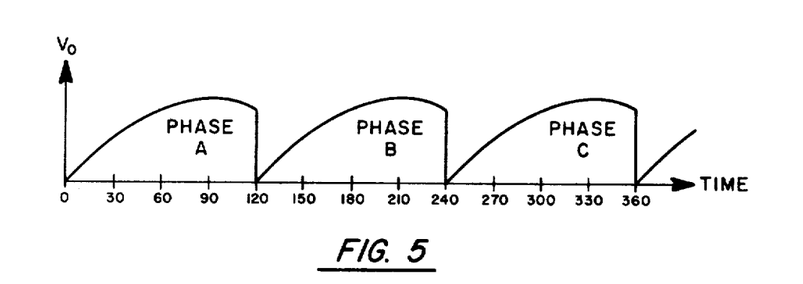
Figure 6:
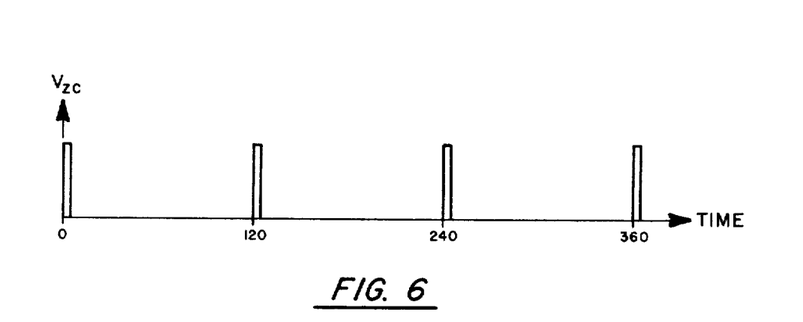
FIG. 6 shows pulses generated by the zero cross detectors shown in FIG. 3 in response to the phase A, B, and C voltage signals shown in FIG. 4. These pulses may be used by a microcomputer system to provide a timing function for monitoring, at selected times, each phase of the three-phase output voltage signal shown in FIG. 5.

The operation of the circuitry shown in FIG. 3 is best understood by referring to FIGS. 4, 5 and 6 which are graphs of typical voltage signals at various selected points in the circuit as a function of time. In FIGS. 4, 5 and 6, the time scale is shown in electrical degrees since typical motor current phases periodically vary thereby creating periodic voltage signals at the selected points. A full time period comprises 360° of each voltage signal and, under stable operating conditions, the voltage signals repeat every 360° time period. A 60 cycle per second frequency for each signal is typical but is not critical to the operation of the circuitry. Therefore, the amount of time corresponding to a full period of each voltage signal shown in FIGS. 4, 5 and 6 is not designated.

In operation, each motor current phase is sensed by a current transformer 131, 231 or 331, which is conveniently designated as a phase A, B, or C current transformer, respectively. The current transformers 131, 231, and 331, each generate a voltage signal having a magnitude which is directly proportional to the magnitude of the current flowing through the motor phase to which each transformer corresponds. Each separate phase A, B, or C voltage signal is supplied through a resistor 132, 232, or 332, respectively, to the noninverting input of a clamped operational amplifier, 133, 233, or 333, respectively.

Referring to FIG. 4, the solid lines represent the phase A, B, and C voltage signals from the operational amplifiers 133, 233, and 333 at points 31, 32 and 33, respectively, of the signal conditioning circuit 2 as shown in FIG. 3. Each phase A, B, or C voltage signal is scaled and clamped in magnitude by the operation of the operational amplifier 133, 233, or 333, respectively, and their associated circuit components. A convenient range of magnitude for the phase A, B or C voltage signal at points 31, 32, or 33, respectively, may be from zero volts to +5 volts for a typical 70 to 700 millivolts signal from the current transformer 10, 11, or 12 respectively. Normally, the phase A, B and C voltage signals are 120° out of phase, as shown in FIG. 4, since each motor current phase is normally 120° out of phase and each voltage signal corresponds to one of these motor current phases.

The phase A, B or C voltage signal from the operational amplifier 133, 233, or 333, respectively, is supplied through a resistor 147, 247, or 347, respectively, to the noninverting input of the operational amplifier 148, 248, or 348, respectively. The dashed lines in FIG. 4 represent typical voltage signals from the operational amplifiers 148, 248, and 348, at the points 34, 35, and 36, respectively, as shown in FIG. 3, in response to the typical voltage signals from the operational amplifiers 133, 233, and 333 shown by the solid lines of FIG. 4. Each operational amplifier 148, 248 and 348 generates a constant voltage signal at the point 34, 35 or 36, respectively, equal to the supply voltage, +V, of its positive voltage supply 134 whenever a positive voltage is applied at the noninverting input of the operational amplifier 148, 248, or 348, respectively. If a negative voltage is applied at the noninverting input then a constant voltage signal equal to the output voltage, −V, of its negative voltage supply 146 is generated by the op amp 148, 248 or 348 at the point 34, 35 or 36, respectively. The constant voltage signal from the operational amplifier 148, 248, or 348, controls the operation of the PNP switching transistor 350, 150, or 250, respectively. Each of the switching transistors 150, 250 and 350, conducts only when a negative voltage is applied at its base and the switching transistors 150, 250, and 350, pass only a positive voltage signal supplied at their emitters when they are conducting.

Referring to FIG. 5, a typical three-phase output voltage signal, $V_o$, at point 37 in FIG. 3, is shown. This three-phase signal corresponds to the phase A, B and C voltage signals, depicted in FIG. 4, being present in the circuitry as described previously. Phase A of the three-phase output voltage signal, $V_o$, corresponds to the 0° to 120° portion of the phase A voltage signal from the operational amplifier 133 at point 31 as shown by the solid line in FIG. 4. This portion of the phase A signal is applied across the load resistor 160 because from minus 60° (which corresponds to 300°) to 120° the phase B signal at point 35 is negative resulting in the switching transistor 150 conducting due to the negative voltage applied at its base. Although the switching transistor 150 is enabled at minus 60° the phase A voltage signal at point 31 is not applied across the load resistor 160 until 0° because this signal is negative until it reaches 0° and the switching transistor 150 passes only positive signals even if its base is properly biased with a negative voltage. Phase A of the output voltage signal, $V_o$, falls to zero at 120° since the phase B biasing signal at point 35 for switching transistor 150 changes from negative to positive at 120° thereby switching the transistor 150 from its conducting state to its nonconducting state.

During the time period from 0° to 120° neither the phase B voltage signal at point 32 nor the phase C voltage signal at point 33 is applied across the load resistor 160. The phase B voltage signal at point 32 is not applied since during this time period since the phase B signal at point 32 is a negative signal which is blocked by the switching transistor 250 even though between 60° and 120° the phase C biasing signal at point 36 is negative thereby properly biasing the base of the switching transistor 250 to enable the transistor 250. The phase C signal at point 33 is not applied across the load resistor 160 during this time period since the phase A biasing signal at point 34 for the switching transistor 350 is positive thereby disabling the switching transistor 350.

From 120° to 240° the phase A voltage signal at point 31 from the operational amplifier 133 is not applied across the load resistor 160 since the phase B biasing signal at point 35 to the base of the switching transistor 150 is positive during this time. However, during the time from 120° to 240°, the phase C biasing signal at point 36 is negative and the phase B voltage signal at point 32 is positive so that the phase B signal at point 32 is applied across the switching transistor 160 between 120° and 240° to form phase B of the output voltage signal, $V_o$, as shown in FIG. 5. Also, between 120° and 240° the phase C voltage signal at point 33 is not applied across the load resistor 160 because the phase C signal at point 33 is negative and the switching transistor 350 will not pass a negative signal even though the phase A biasing signal at point 34 provides a negative bias signal to the base of the transistor 350 from 180° to 360° thereby enabling transistor 350 during this time.

During the time period from 240° to 360° the phase C voltage signal at point 33 is applied across the load resistor 160 to form phase C of the output voltage signal, $V_o$, as shown in FIG. 5. The phase C voltage signal at point 33 is applied across the load resistor 160 during this time period since the switching transistor 350 is conductive and the phase C voltage signal at point 33 is positive. The switching transistor 350 conducts because at 180° the phase A biasing signal at point 34 is negative thereby properly biasing the base of the transistor 350. During the time period 240° to 360°, the phase A voltage signal at point 31 from the operational amplifier 133 is not applied across the load resistor 160 because the phase A signal at point 31 is negative and transistor 150 does not pass a negative signal. Also, the phase B voltage signal at point 32 is not applied at the load resistor 160 during this time period because the phase C biasing signal at point 36 to the base of the switching transistor 250 is positive thereby providing a reverse bias signal which prevents the switching transistor 250 from conducting.

Under normal operating conditions, the previously described three-phase output voltage signal, $V_o$, repeats itself every 360° time period. Variations in the magnitude of the three-phase output voltage signal, $V_o$, occur when there is a variation in the magnitude of the motor current sensed by the current transformer 131, 231, or 331. Also, it should be noted that while the operation of the switching transistors 150, 250 and 350 has been described as keyed to a change in bias voltage between negative and positive this type of change is not required because appropriate circuit modifications may be made to key the operation of the transistors 150, 250, and 350 to any desired constant voltage level. However, it is convenient and preferable to use the zero level.

The PNP transistor 162 and associated circuit components provide a negative voltage clamp at point 37 as shown in the circuitry of FIG. 3. At 0°, 120°, 240°, and 360° the output voltage signal, $V_o$, abruptly changes phase and there may be a negative voltage appearing across the load resistor 160 at these times. The PNP transistor 162 provides a circuit path for shunting negative voltages below a predetermined magnitude to circuit common. Thus, the output voltage signal, $V_o$, is a totally positive signal which may be used with signal processing devices which are preferably operated with positive signals, such as an analog to digital converter 3 as shown in FIG. 1.

The three-phase output voltage signal, $V_o$, may be used directly by an analog to digital converter 3, as shown in FIG. 1, to provide information continuously to a microcomputer 4 as a function of time. However, it is preferable to sample the output voltage signal, $V_o$, at selected times rather than to continuously monitor this signal, $V_o$. For example, it may be desirable to sample phase A of the output voltage signal, $V_o$, at 90°, phase B of the signal at 210°, and phase C of the signal at 330°. Each of these times corresponds to a fixed 90° time after the transition of the transistor biasing pulses at points 34, 35, and 36 from negative to positive at 0°, 120°, and 240°. This sampling of the output voltage signal, $V_o$, may be achieved by triggering the operation of a microcomputer system, such as a microcomputer system comprising the A-D converter and microcomputer 4 described in conjunction with FIG. 1, to zero cross pulses as described with reference to FIG. 6.

Referring to FIG. 6, zero cross pulses, which appear at point 38 in the circuit shown in FIG. 3, are depicted as a function of time. The pulses are generated by the phase A, B and C biasing voltage signals at points 34, 35, and 36, respectively, as shown by the dashed lines in FIG. 4, changing from negative to positive at 0°, 120° and 240°. At these times an electrical pulse from the diode 154, 254 or 354 passes through the capacitor 156, 256 or 356, respectively, to circuit common, through the resistor 157, 257 or 357, respectively. In effect, the capacitors 157, 257 and 357 and their associated circuit components operate as high pass filters to pass only a negative to positive varying signal. This supplies a voltage pulse at an input to the OR gate 170 only during a short time period, which may be on the order of 200 micro-seconds, at the times represented by 0°, 120° and 240°. A voltage signal, $V_{zc}$, is provided at point 38 only when an input signal is present at any one or more of the inputs to the OR gate 170. In response to the phase A, B and C voltage signals at points 31, 32, and 33, respectively, as shown in FIG. 4, there is a series of pulses present at point 38 as shown in FIG. 6. These voltage pulses may be used by a microcomputer system, as shown in FIG. 1, to provide a timing function whereby each phase of the output voltage signal, $V_o$, shown in FIG. 5, is sampled at selected times. For example, the microcomputer system may be operated so that upon the occurrence of a pulse the system waits for a 90° time period before sampling the output voltage signal, $V_o$. This results in periodically sampling phase A, B and C of the output voltage signal, $V_o$, at 90°, 210° and 330°, respectively.

One advantage of the circuitry shown in FIG. 3 is that there are no diodes, or other such relatively large voltage loss devices, in the critical circuit path between the current transformers 131, 231 and 331 and the output signal point 37. Resistor 132, operational amplifier 133, and transistor 150 are in the critical circuit path for the phase A signal. Similarly, the phase B or C signal has resistor 232 or 332, operational amplifier 233 or 333, and transistor 250 or 350, respectively, in its critical circuit path. Thus, the signal conditioning circuit 2 of the present invention is more sensitive than other circuitry wherein such diodes and other similar voltage loss devices are in the critical circuit paths.

Finally, while the present invention has been described in conjunction with a motor protection system for a three-phase AC motor it should be noted that the present invention is suitable for use with a motor protection system for any multi-phase motor. Also, the signal conditioning circuitry of the present invention is useful whenever it is desired to convert a three-phase current signal to a single-line, three-phase voltage signal wherein each phase of the voltage signal corresponds to only one distinct current phase. Therefore, while the present invention has been described in conjunction with a particular embodiment it is to be understood that various modifications and other embodiments of the present invention may be made without departing from the scope of the invention as described herein and as claimed in the appended claims.

What is claimed is:

1. A system for protecting a three-phase alternating current motor from current overload and from current imbalance comprising:

means for sensing the current magnitude of each phase of the alternating current supplied to the motor;

signal conditioning means for generating a three-phase electrical output signal in response to the current magnitudes sensed by the current sensing means, the magnitude of the first, second and third phase of said output signal being proportional to the magnitude of the first, second and third phase, respectively, of the alternating current;

signal processing means for monitoring the magnitude of each phase of the output signal to determine the absolute magnitude of each phase of the alternating current and to determine the relative magnitude of each phase of the alternating current relative to the magnitude of each of the other phases of the alternating current; and means for terminating the operation of the motor when the absolute magnitude of a current phase exceeds a preselected value or when the relative magnitude of a current phase exceeds a preselected value.

2. A control system as recited in claim 1 wherein the signal conditioning means comprises:

means for generating separate first, second and third voltage signals in response to the first, second, and third current phases, respectively, each of said voltage signals having a magnitude which is proportional to the magnitude of the sensed current phase to which it corresponds;

switching means, for connecting either the first, second or third voltage signal to a common load while disconnecting the other voltage signals from the load when the switching means is activated to a first, second, or third state, respectively; and means for detecting a zero cross point of each voltage signal and activating the switching means in response to these points to sequentially connect and disconnect the first, second and third voltage signals to the common load to form a three-phase electrical output signal having first, second and third phases corresponding to the first, second, and third voltage signals, respectively.

3. The signal conditioning circuit as recited in claim 2, further comprising:

means for adjusting the magnitude of each of the three voltage signals, after these signals are generated by the current sensing means, to a scale which is suitable for proper operation of the switching means and the zero cross detection means.

4. The signal conditioning circuit as recited in claims 2 or 3 further comprising means for generating an electrical pulse when the zero cross detection means detects a zero cross point; and, wherein the signal processing means includes a timing means for responding to the pulses to enable the signal processing means to monitor each phase of the output signal at substantially the same fixed time interval after the occurrence of a zero cross pulse.

5. The signal conditioning circuit as recited in claims 2 or 3 wherein the current sensing means comprises three current pickups each of which responds to a separate phase of the three-phase alternating current supplied to the motor.

6. The signal conditioning circuit as recited in claims 2 or 3 wherein the switching means comprises three PNP transistors having their emitters connected in parallel to the common load, having their collectors connected to the current sensing means to apply the first, second and third voltage signal at the collector of the first, second and third transistor, respectively, and having their bases connected to the zero cross detection means to activate the transistors by properly biasing the bases to provide the desired sequential switching sequence.

7. The signal conditioning circuit as recited in claim 6 wherein the zero cross detection means comprises:

a first operational amplifier means for providing an activating biasing signal to the base of the third PNP transistor only when the first voltage signal is below the zero cross level;

a second operational amplifier means for providing an activating biasing signal to the base of the first PNP transistor only when the second voltage signal is below the zero crossing level; and a third operational amplifier means for providing an activating biasing signal to the base of the second PNP transistor only when the third voltage signal is below the zero cross level.

* * * * *